(12) United States Patent
Wännman

(10) Patent No.: US 12,485,095 B2
(45) Date of Patent: Dec. 2, 2025

(54) PLURALITY OF TASQUINIMOD PARTICLES AND USE THEREOF

(71) Applicant: ACTIVE BIOTECH AB, Lund (SE)

(72) Inventor: Hans Wännman, Ängelholm (SE)

(73) Assignee: ACTIVE BIOTECH AB, Lund (SE)

( * ) Notice: Subject to any disclaimer, the term of this patent is extended or adjusted under 35 U.S.C. 154(b) by 246 days.

(21) Appl. No.: 18/289,738

(22) PCT Filed: May 23, 2022

(86) PCT No.: PCT/EP2022/063887
§ 371 (c)(1),
(2) Date: Nov. 6, 2023

(87) PCT Pub. No.: WO2022/248401
PCT Pub. Date: Dec. 1, 2022

(65) Prior Publication Data
US 2024/0285532 A1    Aug. 29, 2024

(30) Foreign Application Priority Data

May 25, 2021 (EP) ..................................... 21175623

(51) Int. Cl.
*A61K 9/14*    (2006.01)
*A61K 31/4704*    (2006.01)

(52) U.S. Cl.
CPC ............ *A61K 9/14* (2013.01); *A61K 31/4704* (2013.01)

(58) Field of Classification Search
None
See application file for complete search history.

(56) References Cited

U.S. PATENT DOCUMENTS 10,213,422 B2    2/2019    Chun et al.

FOREIGN PATENT DOCUMENTS

| WO | 1999055678 | 11/1999 |
| WO | 2000003991 | 1/2000 |
| WO | 2001030758 | 5/2001 |
| WO | 2003106424 | 5/2003 |
| WO | 2012004338 | 1/2012 |
| WO | 2012175541 | 12/2012 |
| WO | 2016042112 | 3/2016 |
| WO | 2016078921 | 5/2016 |
| WO | 2016146329 | 9/2016 |
| WO | 2018105943 | 6/2018 |
| WO | 2022018240 | 1/2022 |
| WO | 2022152902 | 7/2022 |

OTHER PUBLICATIONS

Eurasian Patent Office; First Office Action dated Jun. 11, 2024 in Application No. 202393201.
International Search Report and Written Opinion dated Jul. 22, 2022 in PCT International Patent Application No. PCT/EP2022/063887.
Joshi, J.T., "A Review on Micronization Techniques", J. Pharm. Sci. Technol., vol. 3, pp. 651-681 (2011).

*Primary Examiner* — Brian J Davis
(74) *Attorney, Agent, or Firm* — SNELL & WILMER L.L.P.

(57) ABSTRACT

A plurality of particles of tasquinimod in free base form or as a pharmaceutically acceptable salt, said particles having a D(v, 0.9) of at most 30 µm and a D(v, 0.5) of at most 15 µm. A pharmaceutical composition comprising said particles and preferably one or more pharmaceutically acceptable excipients. A pharmaceutical dosage unit. The particles, composition and dosage unit are useful in the treatment of cancer.

17 Claims, 4 Drawing Sheets

PLURALITY OF TASQUINIMOD PARTICLES AND USE THEREOF

CROSS-REFERENCE TO RELATED APPLICATIONS

This application is a U.S. National Phase Application under 35 U.S.C. § 371 of PCT International Application No. PCT/EP2022/063887, filed May 23, 2022 and entitled "A PLURALITY OF TASQUINIMOD PARTICLES AND USE THEREOF," which claims priority to, and the benefit of, European Patent Application No. EP21175623.4, filed May 25, 2021, 2021, the disclosures of which are each incorporated herein by reference in their entireties for all purposes.

FIELD OF THE INVENTION

The present invention relates to a plurality of particles of tasquinimod or of a pharmaceutically acceptable salt of tasquinimod, and to the use thereof in therapy, as well as to a pharmaceutical composition containing such a plurality of particles. The invention further relates to a solid pharmaceutical dosage unit, e.g. a solid oral pharmaceutical dosage form, such as a capsule or tablet for oral administration, containing a plurality of such particles.

BACKGROUND OF THE INVENTION

Tasquinimod and a method for its preparation were described in International Applications No. PCT/SE99/00676, published as WO 99/55678 and No. PCT/SE99/01270, published as WO 00/03991, which applications also disclosed the utility of tasquinimod and some other quinoline carboxamides for the treatment of diseases resulting from autoimmunity, such as multiple sclerosis, insulin-dependent diabetes mellitus, systemic lupus erythematosus, rheumatoid arthritis, inflammatory bowel disease and psoriasis and, furthermore, diseases where pathologic inflammation plays a major role, such as asthma, atherosclerosis, stroke and Alzheimer's disease.

Processes for preparing tasquinimod also have been described in International Application No. PCT/SE2003/000780, published as WO 03/106424 and in International Application No. PCT/EP2011/061490, published as WO 2012/004338. A deuterated form of tasquinimod was described in International Application No. PCT/EP2012/061798, published as WO 2012/175541.

The use of various quinoline carboxamides for the treatment of cancer, more particularly solid cancers, such as prostate cancer and breast cancer, was disclosed in International Application No. PCT/SE00/02055, published as WO 01/30758. It has been found that these compounds bind to and inhibit the interactions of an immunomodulatory protein (S100A9), which protein promotes tumor development, influences suppressive and pro-angiogenic cells in the tumor microenvironment and participates in the establishment of pre-metastatic niches.

International Application No. PCT/EP2015/075769, published as WO 2016/078921, discloses tasquinimod for use in the treatment of leukemia including acute lymphoblastic leukemia, acute myeloid leukemia, chronic lymphocytic leukemia and chronic myeloid leukemia.

International Application No. PCT/EP2015/071391, published as WO 2016/042112, discloses tasquinimod for use in the treatment of multiple myeloma. International Application No. PCT/EP2016/053288, published as WO 2016/146329, discloses tasquinimod for use in combination with a PD-1 and/or PD-L1 inhibitor in the treatment of cancer, in particular bladder cancer. The use of tasquinimod for the treatment of myeloproliferative neoplasms, such as myelofibrosis, has been disclosed in International Application No. PCT/EP2021/070629, published as WO 2022/018240. The use of tasquinimod for the treatment of myelodysplastic syndrome has been described in International Application No. PCT/EP2022/050891, not yet published. The above identified prior art publications are all incorporated herein by reference.

As is well-known, it is not sufficient to establish that a particular compound has a therapeutic activity useful in treatment of a particular disease, but a suitable form for administration thereof must also be provided to render it practically useful. For ease of administration and patient compliance, oral administration of drugs is normally preferred. In connection with oral administration, the bioavailability is an important factor to consider, and is generally governed by the solubility, gastrointestinal permeability, and dissolution rate of the substance to be administered. Further parameters that must be taken into consideration are associated with the oral administration form, including the ease of manufacturing, the drug product stability and shelf-life, the ease of use for the patient. For example, to obtain a precise and consistent dosage, unit dosage formulations, such as capsules and tablets, may be preferred over liquid formulations, and the former are also generally preferred for ease of transportation and in case of ill-tasting drug substances.

SUMMARY OF THE INVENTION

Tasquinimod, or 4-hydroxy-5-methoxy-N, 1-dimethyl-2-oxo-N-[4-(trifluoromethyl)phenyl]-1,2-dihydroquinoline-3-carboxamide is a compound having the structural formula:

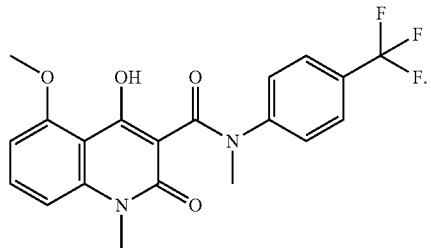 [SMILES: COc1cccc2c1c(O)c(C(=O)N(C)c1ccc(C(F)(F)F)cc1)c(=O)n2C]

Tasquinimod is a compound having high gastrointestinal permeability and high aqueous solubility. Indeed, the gastrointestinal permeability of tasquinimod using the Caco-2 cell model, the permeability coefficient of tasquinimod was found to be $43.5 \pm 0.9 \cdot 10^{-6}$ cm·s$^{-1}$, which ranks tasquinimod as "highly permeable" according to the Biopharmaceutics Classification System (BCS). For a drug compound to be classified as "highly soluble" according to the BCS, the highest single therapeutic dose thereof should be completely soluble in 250 ml or less of aqueous media over the pH range of 1.2-6.8 at 37±1° C. The solubility of tasquinimod exceeds this cut-off value ten-fold under the stated conditions, while at physiological pH at 7.4 the solubility is as high as 50-fold over this cut-off: the solubility of tasquinimod at pH 7.4 is as high as 0.25 mg/ml. Based on these properties, tasquinimod is classified as a BCS Class I compound. If the highly soluble tasquinimod is formulated in an immediate release formulation, the dissolution rate is expected to be high with a dissolution criterion of not less than 85% released in 30 minutes at 37° C. However, the present inventors found the dissolution rate of tasquinimod particles to be surprisingly low. In view of the high water-solubility of tasquinimod, the low dissolution rate of tasquinimod particles in aqueous phase was completely unexpected. A low dissolution rate is susceptible of reducing the bioavailability and may pose an obstacle to an efficient oral administration of an otherwise therapeutically active compound.

Thus, the present invention is based on the surprising finding that the highly water soluble compound tasquinimod suffers from an unexpectedly low aqueous dissolution rate.

A first aspect therefore is a plurality of particles of tasquinimod in free base form or as a pharmaceutically acceptable salt, said particles having a D(v, 0.9) of at most 30 µm and a D(v, 0.5) of at most 15 µm.

A further aspect is the plurality of particles of tasquinimod in free base form or as a pharmaceutically acceptable salt as defined herein, for use in therapy.

A further aspect is a pharmaceutical composition comprising the plurality of particles of tasquinimod in free base form or as a pharmaceutically acceptable salt as defined herein, and preferably one or more pharmaceutically acceptable excipients.

A further aspect is a pharmaceutical dosage unit comprising the pharmaceutical composition as defined herein.

A still further aspect is the plurality of particles of tasquinimod, or the pharmaceutical composition, or the pharmaceutical dosage unit, as defined herein, for use in the treatment of cancer. The cancer may be selected from multiple myeloma, lymphoma, myelodysplastic syndrome, myeloproliferative neoplasm, leukemia, bladder cancer, melanoma, lung cancer, colorectal cancer, breast cancer, pancreatic cancer, prostate cancer, renal cell carcinoma, ovarian cancer, neuroendocrine tumors (NET) and gastro-enteropancreatic neuroendocrine tumors (GEP-NET).

Further aspects and embodiments thereof will become evident from the following description and the claims.

DETAILED DESCRIPTION OF THE INVENTION

Figure 1:
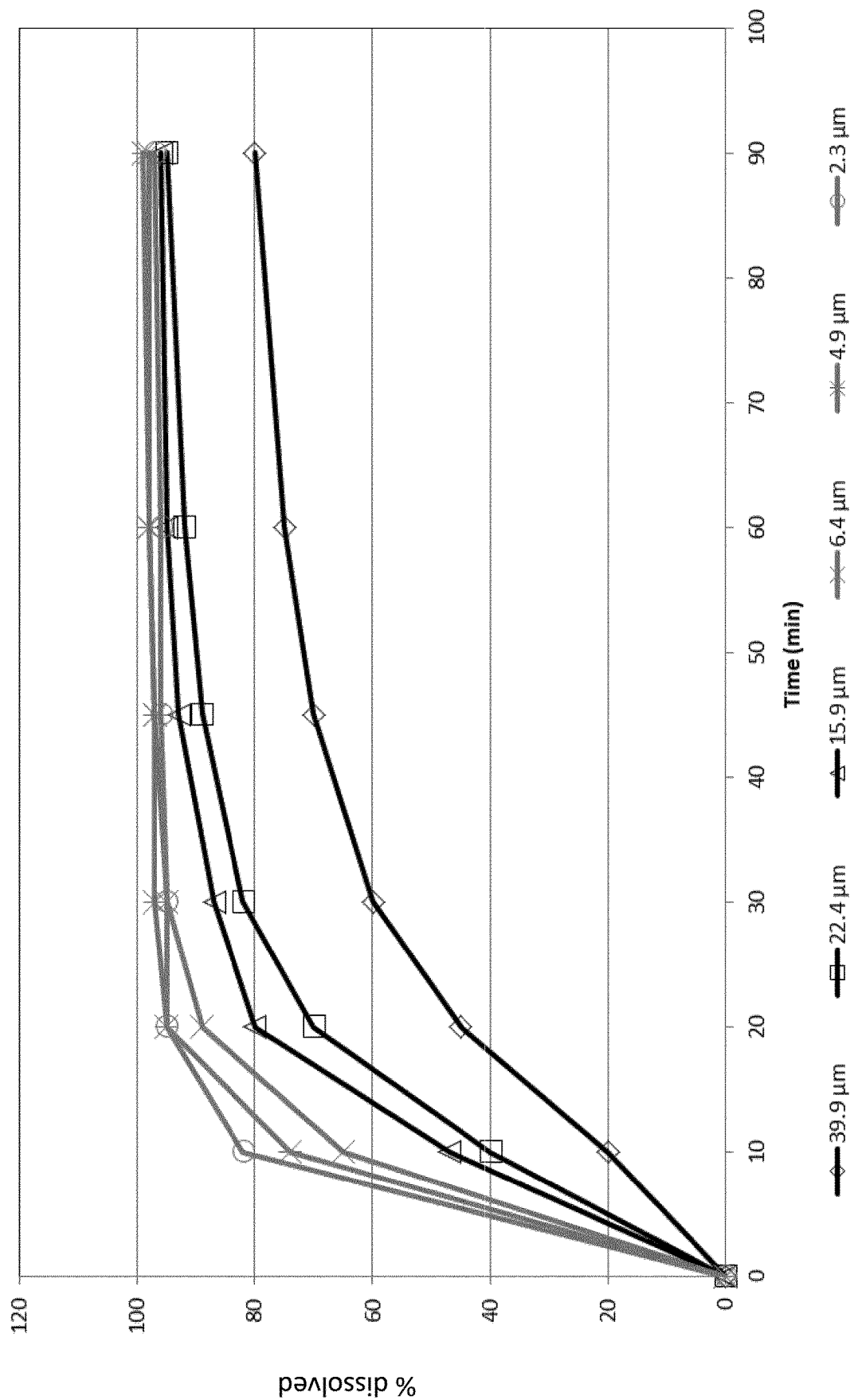
FIG. 1 represents the % by weight of tasquinimod dissolved as a function of time from capsules of Examples 4-6, containing 1 mg of tasquinimod particles having D(v, 0.5) of 2.3 µm, 4.9 µm, and 6.4 µm, respectively, and of Comparative Examples 1-3 (not according to the invention), containing 1 mg of tasquinimod particles having D(v, 0.5) of 15.9 µm, 22.4 µm, and 39.9 µm, respectively, in an in vitro dissolution test.

Unless defined otherwise or clearly indicated by context, all technical and scientific terms and abbreviations used herein have the same meaning as commonly understood by one of ordinary skill in the field of art to which this disclosure belongs. However, definitions of some of the terms used herein will be given herein below.

The term "D(v, 0.9)" as used herein means that 90% of the particles in a composition (based on volume) have a diameter equal to or below a specified value. Thus, for example, a D(v, 0.9) of 25 µm means that 90% of the particles, by volume, have a diameter of or below 25 µm.

The term "D(v, 0.5)" as used herein means that 50% of the particles in a composition (based on volume) have a diameter equal to or below a specified value. Thus, for example, a D(v, 0.5) of 15 µm means that 50% of the particles, by volume, have a diameter equal to or below 15 µm. A D(v, 0.5) ranging from 3 µm to 7 µm means that 50% of the particles, by volume, have a diameter equal to or below a value between 7 µm and 3 µm.

As used herein, the term "effective", as in an amount effective to achieve an end, i.e., "therapeutically effective amount", means the quantity of a component that is sufficient to yield an indicated therapeutic response without undue adverse side effects (such as toxicity, irritation, or allergic response) commensurate with a reasonable benefit/risk ratio when used in the manner of this disclosure. An effective amount may vary according to factors known in the art, such as the disease state, age, sex, and weight of the human or animal being treated.

The term "excipient" refers to pharmaceutically acceptable chemicals, such as known to those of ordinary skill in the art of pharmacy to aid the administration of the medicinal agent. It is a compound that is useful in preparing a pharmaceutical composition, generally safe, non-toxic and neither biologically nor otherwise undesirable, and includes excipients that are acceptable for veterinary use as well as human pharmaceutical use. Exemplary excipients include encapsulating agents, sweeteners, taste-masking agents, carriers, binders, fillers, diluents, disintegrants, anti-adherents, and lubricants.

The term "filler" (which in the pharmaceutical field may also be referred to as a "diluent" or "bulking agent") refers to an ingredient (excipient) in a pharmaceutical composition that lacks pharmacological activity but may be pharmaceutically necessary or desirable, e.g. to enhance or improve the properties of the pharmaceutical blend for manufacturing or physiological purposes. For example, a filler may be used to increase the bulk of an active ingredient the mass of which is too small for manufacture or administration.

The term "lubricant" refers to an excipient which for example prevents ingredients and excipients to lump together, and/or sticking to the dosage form filling machine. A lubricant may also ensure that the formation, filing and ejection of the dosage form can occur, for example by lowering friction. Examples of lubricants are vegetable oils, talc, silicon dioxide (silica), and fatty acids or fatty acid salts.

The term "micronization" as used herein refers to the process of reducing the average diameter of a particles of a solid material. Usually, the term micronization is used when the obtained particles that are produced are only a few micrometres (typically less than 10 µm) in diameter. Micronization techniques are typically based on the use of friction to reduce particle size, e.g. by milling and grinding.

"Optional" or "optionally" means that the subsequently described event or circumstance may or may not occur, and that the description includes instances where the event or circumstance occurs and instances where it does not.

The term "pharmaceutical dosage unit" as used herein includes any device useful for administering a given dose of a drug to a patient, e.g. a capsule, a tablet, a sachet, a micro-capsule, etc.

By "pharmaceutically acceptable" is meant a material that is not biologically or otherwise undesirable, i.e., the material can be administered to an individual along with the relevant active compound without causing clinically unacceptable biological effects or interacting in a deleterious manner with any of the other components of the formulation in which it is contained.

The term "subject" as used herein refers to a mammal. A mammal contemplated by the present invention include a human as well as a non-human mammal, such as a mammal selected from primates, domesticated animals such as farm animals, e.g. cattle, sheep, pigs, horses and the like, as well as pet animals, such as dogs and cats, and the like. Preferably, the mammal is a human.

Herein below, the expression "tasquinimod particle", or "particle of tasquinimod" may be used, and should be understood to refer to particles of tasquinimod, wherein "tasquinimod" should be understood to refer to either tasquinimod free base or tasquinimod in pharmaceutically acceptable salt form, unless otherwise apparent from the context or unless otherwise specified.

It should be noted that tasquinimod as used herein may have any degree of deuteration. In some embodiments, tasquinimod has a degree of deuteration corresponding to the natural abundance of the deuterium isotope. In some other embodiments, tasquinimod as used herein is as described in WO 2012/175541, cf. herein above.

Examples of pharmaceutically acceptable salts comprise salts with (as counter ion) an alkali metal ion, e.g. Li+, Na+ or K+, or with an alkaline earth metal ion, e.g. Mg2+ or Ca2+, or with any other pharmaceutically acceptable metal ion, e.g. Zn2+ or Al3+; or pharmaceutically acceptable salts formed with organic bases, such as diethanolamine, ethanolamine, N-methylglucamine, triethanolamine or tromethamine.

As used herein, "treating" encompasses, e.g., inducing inhibition, regression, or stasis of a disease, disorder or condition, or ameliorating or alleviating a symptom of a disease, disorder or condition.

"Ameliorating" or "alleviating" a condition or state as used herein shall mean to relieve or lessen the symptoms of that condition or state. "Inhibition" of disease progression or disease complication in a subject as used herein means preventing or reducing the disease progression and/or disease complication in the subject.

The Plurality of Tasquinimod Particles

The tasquinimod particle present in the plurality of tasquinimod particles as provided herein essentially consists of tasquinimod, which means that at least 90% by weight of the particle consists of tasquinimod, e.g. at least 95% by weight, preferably at least 96% by weight, more preferably at least 97% by weight, even more preferably at least 98% by weight, at least 98.5% by weight, at least 99% by weight, or at least 99.5% by weight.

As noted herein, to have a required dissolution rate, the tasquinimod particles should have a particle size distribution characterised by a D(v, 0.9) of at most 30 μm.

In some embodiments, the particles have a D(v, 0.9) of at most 29 μm. In some embodiments, the particles have a D(v, 0.9) of at most 28 μm. In some embodiments, the particles have a D(v, 0.9) of at most 27 μm. In some embodiments, the particles have a D(v, 0.9) of at most 26 μm. In some embodiments, the particles have a D(v, 0.9) of at most 25 μm. In some embodiments, the particles have a D(v, 0.9) of at most 24 μm. In some embodiments, the particles have a D(v, 0.9) of at most 23 μm. In some embodiments, the particles have a D(v, 0.9) of at most 22 μm. In some embodiments, the particles have a D(v, 0.9) of at most 21 μm. In some embodiments, the particles have a D(v, 0.9) of at most 20 μm. In some embodiments, the particles have a D(v, 0.9) of at most 19 μm. In some embodiments, the particles have a D(v, 0.9) of at most 18 μm. In some embodiments, the particles have a D(v, 0.9) of at most 17 μm. In some embodiments, the particles have a D(v, 0.9) of at most 16 μm. In some embodiments, the particles have a D(v, 0.9) of at most 15 μm. In some embodiments, the particles have a D(v, 0.9) of at most 14 μm. In some embodiments, the particles have a D(v, 0.9) of at most 13 μm. In some embodiments, the particles have a D(v, 0.9) of at most 12 μm. In some embodiments, the particles have a D(v, 0.9) of at most 11 μm. In some embodiments, the particles have a D(v, 0.9) of at most 10 μm. In some embodiments, the particles have a D(v, 0.9) of at most 9 μm. In some embodiments, the particles have a D(v, 0.9) of at most 8 μm. In some embodiments, the particles have a D(v, 0.9) of at most 7 μm.

In some embodiments, the particles have a D(v, 0.9) of about 30 μm. In some embodiments, the particles have a D(v, 0.9) of about 29 μm. In some embodiments, the particles have a D(v, 0.9) of about 28 μm. In some embodiments, the particles have a D(v, 0.9) of about 27 μm. In some embodiments, the particles have a D(v, 0.9) of about 26 μm. In some embodiments, the particles have a D(v, 0.9) of about 25 μm. In some embodiments, the particles have a D(v, 0.9) of about 24 μm. In some embodiments, the particles have a D(v, 0.9) of about 23 μm. In some embodiments, the particles have a D(v, 0.9) of about 22 μm. In some embodiments, the particles have a D(v, 0.9) of about 21 μm. In some embodiments, the particles have a D(v, 0.9) of about 20 μm. In some embodiments, the particles have a D(v, 0.9) of about 19 μm. In some embodiments, the particles have a D(v, 0.9) of about 18 μm. In some embodiments, the particles have a D(v, 0.9) of about 17 μm. In some embodiments, the particles have a D(v, 0.9) of about 16 μm. In some embodiments, the particles have a D(v, 0.9) of about 15 μm. In some embodiments, the particles have a D(v, 0.9) of about 14 μm. In some embodiments, the particles have a D(v, 0.9) of about 13 μm. In some embodiments, the particles have a D(v, 0.9) of about 12 μm. In some embodiments, the particles have a D(v, 0.9) of about 11 μm. In some embodiments, the particles have a D(v, 0.9) of about 10 μm. In some embodiments, the particles have a D(v, 0.9) of about 9 μm. In some embodiments, the particles have a D(v, 0.9) of about 8 μm. In some embodiments, the particles have a D(v, 0.9) of about 7 μm. In some embodiments, the particles have a D(v, 0.9) of about 6 μm.

In some embodiments, the particles have a D(v, 0.9) in the range of 6 to 30 μm, in the range of 7 to 30 μm, in the range of 8 to 30 μm, in the range of 9 to 30 μm, in the range of 10 to 30 μm, in the range of 11 to 30 μm, in the range of 12 to 30 μm, in the range of 13 to 30 μm, in the range of 14 to 30 μm, in the range of 15 to 30 μm, in the range of 16 to 30 μm, in the range of 17 to 30 μm, in the range of 18 to 30 μm, in the range of 19 to 30 μm, in the range of 20 to 30 μm, in the range of 21 to 30 μm, in the range of 22 to 30 μm, in the range of 23 to 30 μm, in the range of 24 to 30 μm, in the range of 25 to 30 μm, in the range of 26 to 30 μm, in the range of 27 to 30 μm, in the range of 28 to 30 μm, or in the range of 29 to 30 μm.

In some embodiments, the particles have a D(v, 0.9) in the range of 6 to 29 µm, in the range of 7 to 29 µm, in the range of 8 to 29 µm, in the range of 9 to 29 µm, in the range of 10 to 29 µm, in the range of 11 to 29 µm, in the range of 12 to 29 µm, in the range of 13 to 29 µm, in the range of 14 to 29 µm, in the range of 15 to 29 µm, in the range of 16 to 29 µm, in the range of 17 to 29 µm, in the range of 18 to 29 µm, in the range of 19 to 29 µm, in the range of 20 to 29 µm, in the range of 21 to 29 µm, in the range of 22 to 29 µm, in the range of 23 to 29 µm, in the range of 24 to 29 µm, in the range of 25 to 29 µm, in the range of 26 to 29 µm, in the range of 27 to 29 µm, or in the range of 28 to 29 µm.

In some embodiments, the particles have a D(v, 0.9) in the range of 6 to 28 µm, in the range of 7 to 28 µm, in the range of 8 to 28 µm, in the range of 9 to 28 µm, in the range of 10 to 28 µm, in the range of 11 to 28 µm, in the range of 12 to 28 µm, in the range of 13 to 28 µm, in the range of 14 to 28 µm, in the range of 15 to 28 µm, in the range of 16 to 28 µm, in the range of 17 to 28 µm, in the range of 18 to 28 µm, in the range of 19 to 28 µm, in the range of 20 to 28 µm, in the range of 21 to 28 µm, in the range of 22 to 28 µm, in the range of 23 to 28 µm, in the range of 24 to 28 µm, in the range of 25 to 28 µm, in the range of 26 to 28 µm, or in the range of 27 to 28 µm.

In some embodiments, the particles have a D(v, 0.9) in the range of 6 to 27 µm, in the range of 7 to 27 µm, in the range of 8 to 27 µm, in the range of 9 to 27 µm, in the range of 10 to 27 µm, in the range of 11 to 27 µm, in the range of 12 to 27 µm, in the range of 13 to 27 µm, in the range of 14 to 27 µm, in the range of 15 to 27 µm, in the range of 16 to 27 µm, in the range of 17 to 27 µm, in the range of 18 to 27 µm, in the range of 19 to 27 µm, in the range of 20 to 27 µm, in the range of 21 to 27 µm, in the range of 22 to 27 µm, in the range of 23 to 27 µm, in the range of 24 to 27 µm, in the range of 25 to 27 µm, or in the range of 26 to 27 µm.

In some embodiments, the particles have a D(v, 0.9) in the range of 6 to 26 µm, in the range of 7 to 26 µm, in the range of 8 to 26 µm, in the range of 9 to 26 µm, in the range of 10 to 26 µm, in the range of 11 to 26 µm, in the range of 12 to 26 µm, in the range of 13 to 26 µm, in the range of 14 to 26 µm, in the range of 15 to 26 µm, in the range of 16 to 26 µm, in the range of 17 to 26 µm, in the range of 18 to 26 µm, in the range of 19 to 26 µm, in the range of 20 to 26 µm, in the range of 21 to 26 µm, in the range of 22 to 26 µm, in the range of 23 to 26 µm, in the range of 24 to 26 µm, or in the range of 25 to 26 µm.

In some embodiments, the particles have a D(v, 0.9) in the range of 6 to 25 µm, in the range of 7 to 25 µm, in the range of 8 to 25 µm, in the range of 9 to 25 µm, in the range of 10 to 25 µm, in the range of 11 to 25 µm, in the range of 12 to 25 µm, in the range of 13 to 25 µm, in the range of 14 to 25 µm, in the range of 15 to 25 µm, in the range of 16 to 25 µm, in the range of 17 to 25 µm, in the range of 18 to 25 µm, in the range of 19 to 25 µm, in the range of 20 to 25 µm, in the range of 21 to 25 µm, in the range of 22 to 25 µm, in the range of 23 to 25 µm, or in the range of 24 to 25 µm.

In some embodiments, the particles have a D(v, 0.9) in the range of 6 to 24 µm, in the range of 7 to 24 µm, in the range of 8 to 24 µm, in the range of 9 to 24 µm, in the range of 10 to 24 µm, in the range of 11 to 24 µm, in the range of 12 to 24 µm, in the range of 13 to 24 µm, in the range of 14 to 24 µm, in the range of 15 to 24 µm, in the range of 16 to 24 µm, in the range of 17 to 24 µm, in the range of 18 to 24 µm, in the range of 19 to 24 µm, in the range of 20 to 24 µm, in the range of 21 to 24 µm, in the range of 22 to 24 µm, or in the range of 23 to 24 µm.

In some embodiments, the particles have a D(v, 0.9) in the range of 6 to 23 µm, in the range of 7 to 23 µm, in the range of 8 to 23 µm, in the range of 9 to 23 µm, in the range of 10 to 23 µm, in the range of 11 to 23 µm, in the range of 12 to 23 µm, in the range of 13 to 23 µm, in the range of 14 to 23 µm, in the range of 15 to 23 µm, in the range of 16 to 23 µm, in the range of 17 to 23 µm, in the range of 18 to 23 µm, in the range of 19 to 23 µm, in the range of 20 to 23 µm, in the range of 21 to 23 µm, or in the range of 22 to 23 µm.

In some embodiments, the particles have a D(v, 0.9) in the range of 6 to 22 µm, in the range of 7 to 22 µm, in the range of 8 to 22 µm, in the range of 9 to 22 µm, in the range of 10 to 22 µm, in the range of 11 to 22 µm, in the range of 12 to 22 µm, in the range of 13 to 22 µm, in the range of 14 to 22 µm, in the range of 15 to 22 µm, in the range of 16 to 22 µm, in the range of 17 to 22 µm, in the range of 18 to 22 µm, in the range of 19 to 22 µm, in the range of 20 to 22 µm, or in the range of 21 to 22 µm.

In some embodiments, the particles have a D(v, 0.9) in the range of 6 to 21 µm, in the range of 7 to 21 µm, in the range of 8 to 21 µm, in the range of 9 to 21 µm, in the range of 10 to 21 µm, in the range of 11 to 21 µm, in the range of 12 to 21 µm, in the range of 13 to 21 µm, in the range of 14 to 21 µm, in the range of 15 to 21 µm, in the range of 16 to 21 µm, in the range of 17 to 21 µm, in the range of 18 to 21 µm, in the range of 19 to 21 µm, or in the range of 20 to 21 µm.

In some embodiments, the particles have a D(v, 0.9) in the range of 6 to 20 µm, in the range of 7 to 20 µm, in the range of 8 to 20 µm, in the range of 9 to 20 µm, in the range of 10 to 20 µm, in the range of 11 to 20 µm, in the range of 12 to 20 µm, in the range of 13 to 20 µm, in the range of 14 to 20 µm, in the range of 15 to 20 µm, in the range of 16 to 20 µm, in the range of 17 to 20 µm, in the range of 18 to 20 µm, or in the range of 19 to 20 µm.

In some embodiments, the particles have a D(v, 0.9) in the range of 6 to 19 µm, in the range of 7 to 19 µm, in the range of 8 to 19 µm, in the range of 9 to 19 µm, in the range of 10 to 19 µm, in the range of 11 to 19 µm, in the range of 12 to 19 µm, in the range of 13 to 19 µm, in the range of 14 to 19 µm, in the range of 15 to 19 µm, in the range of 16 to 19 µm, in the range of 17 to 19 µm, or in the range of 18 to 19 µm.

In some embodiments, the particles have a D(v, 0.9) in the range of 6 to 18 µm, in the range of 7 to 18 µm, in the range of 8 to 18 µm, in the range of 9 to 18 µm, in the range of 10 to 18 µm, in the range of 11 to 18 µm, in the range of 12 to 18 µm, in the range of 13 to 18 µm, in the range of 14 to 18 µm, in the range of 15 to 18 µm, in the range of 16 to 18 µm, or in the range of 17 to 18 µm.

In some embodiments, the particles have a D(v, 0.9) in the range of 6 to 17 µm, in the range of 7 to 17 µm, in the range of 8 to 17 µm, in the range of 9 to 17 µm, in the range of 10 to 17 µm, in the range of 11 to 17 µm, in the range of 12 to 17 µm, in the range of 13 to 17 µm, in the range of 14 to 17 µm, in the range of 15 to 17 µm, or in the range of 16 to 17 µm.

In some embodiments, the particles have a D(v, 0.9) in the range of 6 to 16 µm, in the range of 7 to 16 µm, in the range of 8 to 16 µm, in the range of 9 to 16 µm, in the range of 10 to 16 µm, in the range of 11 to 16 µm, in the range of 12 to 16 µm, in the range of 13 to 16 µm, in the range of 14 to 16 µm, or in the range of 15 to 16 µm.

In some embodiments, the particles have a D(v, 0.9) in the range of 6 to 15 µm, in the range of 7 to 15 µm, in the range of 8 to 15 µm, in the range of 9 to 15 µm, in the range of 10 to 15 µm, in the range of 11 to 15 µm, in the range of 12 to 15 µm, in the range of 13 to 15 µm, or in the range of 14 to 15 µm.

In some embodiments, the particles have a D(v, 0.9) in the range of 6 to 14 µm, in the range of 7 to 14 µm, in the range of 8 to 14 µm, in the range of 9 to 14 µm, in the range of 10 to 14 µm, in the range of 11 to 14 µm, in the range of 12 to 14 µm, or in the range of 13 to 14 µm.

In some embodiments, the particles have a D(v, 0.9) in the range of 6 to 13 µm, in the range of 7 to 13 µm, in the range of 8 to 13 µm, in the range of 9 to 13 µm, in the range of 10 to 13 µm, in the range of 11 to 13 µm, or in the range of 12 to 13 µm.

In some embodiments, the particles have a D(v, 0.9) in the range of 6 to 12 µm, in the range of 7 to 12 µm, in the range of 8 to 12 µm, in the range of 9 to 12 µm, in the range of 10 to 12 µm, or in the range of 11 to 12 µm.

In some embodiments, the particles have a D(v, 0.9) in the range of 6 to 11 µm, in the range of 7 to 11 µm, in the range of 8 to 11 µm, in the range of 9 to 11 µm, or in the range of 10 to 11 µm.

In some embodiments, the particles have a D(v, 0.9) in the range of 6 to 10 µm, in the range of 7 to 10 µm, in the range of 8 to 10 µm, or in the range of 9 to 10 µm.

In some embodiments, the particles have a D(v, 0.9) in the range of 6 to 9 µm, in the range of 7 to 9 µm, or in the range of 8 to 9 µm. In some embodiments, the particles have a D(v, 0.9) in the range of 6 to 8 µm, or in the range of 7 to 8 µm. In some embodiments, the particles have a D(v, 0.9) in the range of 6 to 7 µm.

Preferably, the tasquinimod particles as provided herein should have a particle size distribution characterised by a D(v, 0.5) of at most 15 µm. In some embodiments, the particles have a D(v, 0.5) of 14 µm. In some embodiments, the particles have a D(v, 0.5) of 13 µm. In some embodiments, the particles have a D(v, 0.5) of 12 µm. In some embodiments, the particles have a D(v, 0.5) of 11 µm. In some embodiments, the particles have a D(v, 0.5) of 10 µm. In some embodiments, the particles have a D(v, 0.5) of 9 µm. In some embodiments, the particles have a D(v, 0.5) of 8 µm. In some embodiments, the particles have a D(v, 0.5) of 7 µm. In some embodiments, the particles have a D(v, 0.5) of 6 µm. In some embodiments, the particles have a D(v, 0.5) of 5 µm. In some embodiments, the particles have a D(v, 0.5) of 4 µm. In some embodiments, the particles have a D(v, 0.5) of 3 µm. In some embodiments, the particles have a D(v, 0.5) of 2 µm. In some embodiments, the particles have a D(v, 0.5) of 1 µm.

In some embodiments, the particles have a D(v, 0.5) in the range of 1 to 15 µm, in the range of 2 to 15 µm, in the range of 3 to 15 µm, in the range of 4 to 15 µm, in the range of 5 to 15 µm, in the range of 6 to 15 µm, in the range of 7 to 15 µm, in the range of 8 to 15 µm, in the range of 9 to 15 µm, in the range of 10 to 15 µm, in the range of 11 to 15 µm, in the range of 12 to 15 µm, in the range of 13 to 15 µm, in the range of 14 to 15 µm.

In some embodiments, the particles have a D(v, 0.5) in the range of 1 to 14 µm, in the range of 2 to 14 µm, in the range of 3 to 14 µm, in the range of 4 to 14 µm, in the range of 5 to 14 µm, in the range of 6 to 14 µm, in the range of 7 to 14 µm, in the range of 8 to 14 µm, in the range of 9 to 14 µm, in the range of 10 to 14 µm, in the range of 11 to 14 µm, in the range of 12 to 14 µm, or in the range of 13 to 14 µm.

In some embodiments, the particles have a D(v, 0.5) in the range of 1 to 13 µm, in the range of 2 to 13 µm, in the range of 3 to 13 µm, in the range of 4 to 13 µm, in the range of 5 to 13 µm, in the range of 6 to 13 µm, in the range of 7 to 13 µm, in the range of 8 to 13 µm, in the range of 9 to 13 µm, in the range of 10 to 13 µm, in the range of 11 to 13 µm, or in the range of 12 to 13 µm.

In some embodiments, the particles have a D(v, 0.5) in the range of 1 to 12 µm, in the range of 2 to 12 µm, in the range of 3 to 12 µm, in the range of 4 to 12 µm, in the range of 5 to 12 µm, in the range of 6 to 12 µm, in the range of 7 to 12 µm, in the range of 8 to 12 µm, in the range of 9 to 12 µm, in the range of 10 to 12 µm, or in the range of 11 to 12 µm.

In some embodiments, the particles have a D(v, 0.5) in the range of 1 to 11 µm, in the range of 2 to 11 µm, in the range of 3 to 11 µm, in the range of 4 to 11 µm, in the range of 5 to 11 µm, in the range of 6 to 11 µm, in the range of 7 to 11 µm, in the range of 8 to 11 µm, in the range of 9 to 11 µm, or in the range of 10 to 11 µm.

In some embodiments, the particles have a D(v, 0.5) in the range of 1 to 10 µm, in the range of 2 to 10 µm, in the range of 3 to 10 µm, in the range of 4 to 10 µm, in the range of 5 to 10 µm, in the range of 6 to 10 µm, in the range of 7 to 10 µm, in the range of 8 to 10 µm, or in the range of 9 to 10 µm.

In some embodiments, the particles have a D(v, 0.5) in the range of 1 to 9 µm, in the range of 2 to 9 µm, in the range of 3 to 9 µm, in the range of 4 to 9 µm, in the range of 5 to 9 µm, in the range of 6 to 9 µm, in the range of 7 to 9 µm, or in the range of 8 to 9 µm.

In some embodiments, the particles have a D(v, 0.5) in the range of 1 to 8 µm, in the range of 2 to 8 µm, in the range of 3 to 8 µm, in the range of 4 to 8 µm, in the range of 5 to 8 µm, in the range of 6 to 8 µm, or in the range of 7 to 8 µm.

In some embodiments, the particles have a D(v, 0.5) in the range of 1 to 7 µm, in the range of 2 to 7 µm, in the range of 3 to 7 µm, in the range of 4 to 7 µm, in the range of 5 to 7 µm, or in the range of 6 to 7 µm.

In some embodiments, the particles have a D(v, 0.5) in the range of 1 to 6 µm, in the range of 2 to 6 µm, in the range of 3 to 6 µm, in the range of 4 to 6 µm, or in the range of 5 to 6 µm.

In some embodiments, the particles have a D(v, 0.5) in the range of 1 to 5 µm, in the range of 2 to 5 µm, in the range of 3 to 5 µm, or in the range of 4 to 5 µm.

In some embodiments, the particles have a D(v, 0.5) in the range of 1 to 4 µm, in the range of 2 to 4 µm, or in the range of 3 to 4 µm.

In some embodiments, the particles have a D(v, 0.5) in the range of 1 to 3 µm, in the range of 2 to 3 µm, or in the range of 1 to 2 µm.

Generally, D(v, 0.5) is in the range of 1 µm to 15 µm, and D(v, 0.9) is at most 30 µm, e.g. D(v, 0.9) is in the range of 6 to 30 µm. In some embodiments, D(v, 0.5) is in the range of 1 µm to 10 µm, and D(v, 0.9) is at most 27 µm, e.g. D(v, 0.9) is in the range of 6 to 27 µm. In some further embodiments, D(v, 0.5) is in the range of 1 µm to 9 µm, and D(v, 0.9) is at most 25 µm, e.g. D(v, 0.9) is in the range of 6 to 25 µm.

In some further embodiments, D(v, 0.5) is in the range of 2 µm to 10 µm, and D(v, 0.9) is at most 25 µm, e.g. D(v, 0.9) is in the range of 6 to 25 µm. In some further embodiments, D(v, 0.5) is in the range of 2 µm to 9 µm, and D(v, 0.9) is at most 25 µm, e.g. D(v, 0.9) is in the range of 6 to 25 µm.

In some further embodiments, D(v, 0.5) is in the range of 3 µm to 9 µm, and D(v, 0.9) is at most 25 µm, e.g. D(v, 0.9) is in the range of 6 to 25 µm. In some further embodiments, D(v, 0.5) is in the range of 3 µm to 8 µm, and D(v, 0.9) is at most 25 µm, e.g. D(v, 0.9) is in the range of 6 to 25 µm. In some further embodiments, D(v, 0.5) is in the range of 3 µm to 7 µm, and D(v, 0.9) is at most 25 µm, e.g. D(v, 0.9) is in the range of 6 to 25 µm. In some of these embodiments, D(v, 0.9) is in the range of 7 to 25 µm, or 8 to 25 µm, or 9 to 25 µm, or 10 to 25 µm.

Thus, in some further embodiments, D(v, 0.5) is in the range of 3 μm to 9 μm, and D(v, 0.9) is in the range of 10 to 25 μm, or D(v, 0.5) is in the range of 3 μm to 8 μm, and D(v, 0.9) is in the range of 10 to 25 μm, or D(v, 0.5) is in the range of 3 μm to 7 μm, and D(v, 0.9) is in the range of 10 to 25 μm.

In some further embodiments, D(v, 0.5) is in the range of 2 μm to 9 μm, in the range of 2 μm to 8 μm, in the range of 2 μm to 7 μm, in the range of 3 μm to 9 μm, in the range of 3 μm to 8 μm, or in the range of 3 μm to 7 μm, and D(v, 0.9) is at most 20 μm, e.g. in the range of 10 to 20 μm.

In some further embodiments, D(v, 0.5) is in the range of 2 μm to 9 μm, in the range of 2 μm to 8 μm, in the range of 2 μm to 7 μm, in the range of 3 μm to 9 μm, in the range of 3 μm to 8 μm, or in the range of 3 μm to 7 μm, and D(v, 0.9) is at most 16 μm, e.g. in the range of 10 to 16 μm.

It goes without saying that for any given particle population, the value of D(v, 0.9) will always be higher than the value of D(v, 0.5). It is preferred that the difference between D(v, 0.5) and D(v, 0.9) be as small as possible, corresponding to as narrow a particle size distribution as possible.

A narrow particle size distribution will correspond to a low value for the ratio r obtained by dividing the difference between the values of D(v, 0.9) and D(v, 0.5), by the value of D(v, 0.5), as expressed by the equation:

$$r = \frac{D(v, 0.9) - D(v, 0.5)}{D(v, 0.5)}$$

wherein r is >0.

In some embodiments, the particle population provided herein has a ratio r of at most 6, at most 5, at most 4.5, at most 4, at most 3.5, at most 3, at most 2.5, at most 2.4, at most 2.3, at most 2.2, at most 2.1, or at most 2. For example, in some embodiments, the particle population provided herein has a ratio r in the range of 1 to 6, 1 to 5, 1 to 4, 1 to 3.5, 1 to 3, 1 to 2.5, 1 to 2.4, 1 to 2.3, 1 to 2.2, 1 to 2.1, or 1 to 2. In some embodiments, the particle population provided herein has a ratio r in the range of 1.5 to 5, 1.5 to 4, 1.5 to 3.5, 1.5 to 3, 1.5 to 2.5, 1.5 to 2.4, 1.5 to 2.3, 1.5 to 2.2, 1.5 to 2.1, or 1.5 to 2. In some further embodiments, the particle population provided herein has a ratio r in the range of 2 to 5, 2 to 4, 2 to 3.5, 2 to 3, 2 to 2.5, 2 to 2.4, 2 to 2.3, 2 to 2.2, or 2 to 2.1.

Preparation of the Tasquinimod Particles

Tasquinimod in powder form is commercially available, e.g. from MilliporeSigma, and may also be prepared e.g. by following the methods as described in WO 03/106424 and WO 2012/004338 (cf. herein above). The tasquinimod particles as used herein may be prepared starting from tasquinimod in powder form, and by applying any suitable method for obtaining particles of the required particle size distribution, e.g. by micronization, using common micronization equipment, such as mechanical impact mills (spiral jet mills) or fluid energy (fluid bed) impact mills. In some embodiments, the tasquinimod particles are prepared by micronizing tasquinimod powder with a fluid energy jet mill using nitrogen as the processing gas. In some embodiments, the tasquinimod particles are prepared by preparing tasquinimod as described in WO 2012/004338, e.g. in Example 4 of WO 2012/004338, and by micronizing the obtained product, e.g. with a fluid energy jet mill using nitrogen as the processing gas.

The tasquinimod particles of the invention may comprise crystalline tasquinimod as well as amorphous tasquinimod. In some embodiments, the particles at least partly consist of crystalline tasquinimod, e.g. at least 50% by weight of the total amount of tasquinimod is crystalline, or at least 60%, or at least 70%, or at least 80%, or at least 90%, or at least 95%, or at least 96%, or at least 97%, or at least 98%, or at least 99% by weight of the total amount of tasquinimod is crystalline. In some embodiments, the particles consist of crystalline tasquinimod. In some other embodiments, at least some of the particles consist of amorphous tasquinimod, or most of the particles consist of amorphous tasquinimod, or all of the particles consist of amorphous tasquinimod.

The particle size distribution of the tasquinimod particles may be determined using laser diffraction technology, e.g. a laser particle size analyzer, e.g. a Malvern Mastersizer instrument as commercially available from Malvern Panalytical.

The Pharmaceutical Composition

The pharmaceutical composition provided herein comprises tasquinimod particles of the invention and preferably one or more pharmaceutically acceptable excipients. In some embodiments, the composition comprises a filler (which may also be termed "diluent") and/or a lubricant. A suitable filler may be, for example, silicified microcrystalline cellulose, pregelatinised starch, e.g. from maize, mannitol, lactose monohydrate, microcrystalline cellulose, or calcium hydrogen phosphate. A suitable lubricant may be, for example, hydrogenated vegetable oil, magnesium stearate, or sodium stearate fumarate.

In some embodiments, the lubricant is hydrogenated vegetable oil. Hydrogenated vegetable oil occurs as white to yellowish-white flakes or pellets. It is made from fully hydrogenated refined vegetable oil that is sprayed resulting in a dry, fine powder. The molecular formula of hydrogenated vegetable oil is $R^1COOCH_2$—$CH(OOCR^2)$—$CH_2COOR^3$ (where $R^1$, $R^2$ and $R^3$ are mainly C15 and C17 alkyl). Examples of hydrogenated vegetable oil that may be used in the pharmaceutical compositions are Sterotex®, commercially available from Abitec Corp., and Lubritab®, commercially available from JRS Pharma.

In some embodiments, the filler is pregelatinised starch, i.e. starch that has been chemically and/or mechanically processed to rupture all or part of the starch granules, and having the molecular formula $(C_6H_{10}O_5)_n$ (where n=300 to 1000). Non-limiting examples of pregelatinised starch that may be used in the pharmaceutical composition are Starch 1500®, commercially available from Colorcon Inc., and Lycatab C®, commercially available from Roquette.

In some embodiments, the composition comprises a filler, such as pregelatinised starch, and a lubricant, such as hydrogenated vegetable oil.

In some embodiments, the composition comprises tasquinimod particles, pregelatinised starch, and hydrogenated vegetable oil.

The pharmaceutical composition provided herein may comprise tasquinimod particles in an amount of, for example, about 0.1 to about 10% by total weight of the composition, or about 0.1 to about 9% by total weight of the composition, e.g. about 0.1 to about 8%, about 0.1 to about 7%, about 0.1 to about 6%, about 0.1 to about 5%, about 0.1 to about 4%, or about 0.1 to about 3%, about 0.1 to about 2%, or about 0.1 to about 1%, by total weight of the composition.

The pharmaceutical composition provided herein may comprise excipient(s) in an amount of about, for example, 90 to about 99.9% by total weight of the composition, or about 95 to about 99.9% by total weight of the composition, e.g. about 96 to about 99.9%, about 97 to about 99.9%, about 97.5 to about 99.9%, about 98 to about 99.9%, about 98.5 to about 99.9%, or about 99 to about 99.9%, by total weight of the composition.

Generally, the main portion of the excipients consists of the filler, whereas the amount of lubricant, if present, generally is rather small, e.g. about 0.5 to 4% by weight, about 0.5 to 3% by weight, about 1 to 3% by weight, or about 1.5 to 2.5% by weight, by total weight of the composition.

In some embodiments, the pharmaceutical composition provided herein comprises about 0.1 to 2% by weight of tasquinimod particles, about 0.5 to 4% by weight of lubricant, and about 94 to about 99.4% by weight of filler, based on the total weight of the composition; e.g. about 0.1 to 1% of tasquinimod particles, about 1 to 3% by weight of lubricant, and about 96% to about 98.9% by weight of filler, based on the total weight of the composition.

In some embodiments, the composition comprises tasquinimod particles in an amount of about 0.1 to 1%, lubricant in an amount of about 1.5 to 2.5% by weight, and filler in an amount of about 96.5 to about 98.4% by weight, based on the total weight of the composition.

An advantageous feature of the pharmaceutical composition as provided herein is the rapid dissolution of the tasquinimod particles contained in the composition. In some embodiments, at least 80%, more preferably at least 85% by weight of the tasquinimod particles of the composition dissolve within 30 minutes, when tested in a type I basket apparatus using 1 mg of the composition in 500 ml of a 0.05 M phosphate buffer, pH 6.8, at 37° C. bath temperatures and 100 rpm stirring speed. Such a high dissolution rate corresponds to an in vivo immediate release, and therefore, in some embodiments, the composition of the present invention is useful as an immediate release formulation.

The Pharmaceutical Dosage Unit

Also provided herein is a pharmaceutical dosage unit containing a therapeutically effective amount of tasquinimod in the form of the tasquinimod particles as disclosed herein.

The pharmaceutical dosage unit may comprise, for example, 0.1 to 2 mg of tasquinimod particles, e.g. about 0.25 to 1.5 mg, in particular about 0.5 to about 1.25 mg, such as 1.0 mg of tasquinimod particles and optionally one or more excipients.

In some embodiments, the pharmaceutical dosage unit comprises a pharmaceutical composition as defined herein in an amount corresponding to a therapeutically effective amount of the tasquinimod particles, such as 0.1 to 2 mg, e.g. about 0.25 to 1.5 mg, in particular about 0.5 to about 1.25 mg, such as about 1.0 mg.

In some embodiments, the pharmaceutical dosage unit is suitable for oral administration, e.g. it is a capsule or tablet for oral administration.

In some embodiments, the pharmaceutical dosage unit is an immediate-release pharmaceutical dosage unit.

In some embodiments, the pharmaceutical dosage unit is a capsule suitable for oral administration (which may also be referred to as an oral capsule), such as a hard-shell or soft-shell capsule comprising a pharmaceutically effective amount of the pharmaceutical composition as disclosed herein. In some embodiments, the capsule is a hard-shell capsule, such as HMPC or gelatine capsule. In some embodiments, the capsule is a size 4 or size 3 capsule. In some embodiments, the capsule is a hard-shell size 4 capsule, such as a hard-shell size 4 gelatine capsule.

In some embodiments, the pharmaceutical dosage unit is a hard-shell capsule, e.g. a size 4 capsule, containing an effective amount of tasquinimod particles, and one or more pharmaceutically acceptable excipients, e.g. a filler and a lubricant. In some embodiments, the capsule is a hard-shell capsule containing about 100 to 250 mg, e.g. about 150 to 200 mg, of the pharmaceutical composition provided herein. In some embodiments, the pharmaceutical dosage unit is a size 4 or size 3 hard-shell capsule containing about 0.1 to 2 mg of tasquinimod particles, e.g. about 0.25 to 1.5 mg, in particular about 0.5 to about 1.25 mg, such as 1.0 mg of tasquinimod particles, in combination with a filler and a lubricant, e.g. pregelatinised starch and hydrogenated vegetable oil. In some embodiments, the pharmaceutical dosage unit is a size 4 hard-shell capsule containing about 0.5 to about 1.25 mg tasquinimod particles, such as 1.0 mg of tasquinimod particles, in combination with a filler and a lubricant, e.g. pregelatinised starch and hydrogenated vegetable oil.

The pharmaceutical composition provided herein, containing small and homogeneously sized tasquinimod particles, will allow for a consistent and rapid release of tasquinimod in the gastrointestinal tract of the treated subject, which is advantageous for the purpose of providing a dosage unit having a high and uniform bioavailability of tasquinimod. As shown herein, the pharmaceutical composition of the invention may be used to prepare an immediate release pharmaceutical dosage unit. Thus, in some embodiments, the pharmaceutical dosage unit is an immediate release oral dosage unit, e.g. an immediate release capsule.

In some embodiments, the composition is provided in an oral capsule that has an enteric coating, i.e. a coating that resists dissolution under acidic conditions, and that dissolves only in the intestine, to provide an immediate release of tasquinimod in the intestinal compartment (delayed immediate release). Enteric coating materials are well-known to the person of ordinary skill in the art and are commercially available. A non-limiting example is Kollicoat® 100 P, a coating material based on a methacrylic aid-ethyl acrylate copolymer. Thus, in some embodiments, the pharmaceutical dosage unit provided herein is a delayed immediate release oral dosage unit, e.g. an enteric capsule.

The Use of the Plurality of Particles and of the Composition

As mentioned herein above, the therapeutic activity of tasquinimod in the treatment of various diseases has been previously shown. It is considered that the plurality of tasquinimod particles, the pharmaceutical composition and the pharmaceutical dosage unit prepared by use of such particles will be useful in therapy, in particular in the treatment of any of those diseases for which tasquinimod has been previously shown as having a therapeutic activity. Thus, a further aspect is said plurality of particles, pharmaceutical composition and pharmaceutical dosage unit, for use in the treatment of cancer.

A further aspect is the use of the plurality of particles of tasquinimod or the use of a pharmaceutical composition containing such plurality of particles in the manufacture of a medicament for the treatment of cancer. In some embodiments, the manufacture comprises encapsulating a pharmaceutical composition as defined herein, applying encapsulating techniques well-known in the technical field. In some other embodiments, the manufacture comprises preparing a tablet, using tabletting techniques, also well-known in the technical field.

A still further aspect is a method for the treatment of cancer by administering an effective amount of the plurality of particles of tasquinimod or of a pharmaceutical composition or dosage unit as provided herein to a mammal in need of such treatment. Preferably, the method comprises oral administration of the composition, e.g. in the form of an oral dosage unit, such as an oral tablet or capsule, preferably an oral capsule.

In some embodiments, the cancer is selected from bladder cancer, melanoma, lung cancer such as NSCLC (Non-Small Cell Lung Cancer), colorectal cancer, breast cancer, pancreatic cancer, prostate cancer, renal cell carcinoma, hematologic malignancies, in particular advanced hematologic malignancies, ovarian cancer, in particular, platinum-resistant ovarian cancer, neuroendocrine tumors (NET) and gastroenteropancreatic neuroendocrine tumors (GEP-NET). The cancer treated with the composition of the present invention can be any stage, e.g. early stage or late stage. In some embodiments, the treatment results in sustained response in the individual after cessation of the treatment. In some embodiments, the treatment produces a complete response, a partial response, or stable disease in the individual.

In some embodiments, the cancer is a hematologic cancer, such as leukemia, lymphoma, myelodysplastic syndrome, myeloproliferative neoplasm, or multiple myeloma. In some embodiments, the hematological cancer is selected from leukemia and multiple myeloma. In some embodiments, the hematological cancer is selected from leukemia, myelodysplastic syndrome, and myeloproliferative neoplasm.

In some embodiments, the hematologic cancer is leukemia. In some embodiments, the hematologic cancer is lymphoma. In some embodiments, the hematologic cancer is myelodysplastic syndrome. In some embodiments, the hematologic cancer is a myeloproliferative neoplasm. In some embodiments, the hematologic cancer is multiple myeloma.

The leukemia may be selected from chronic lymphocytic leukemia, including hairy cell leukemia, chronic myeloid leukemia, acute lymphocytic leukemia, and acute myeloid leukemia and its precursor, myelodysplastic syndrome. In some embodiments, the leukemia is acute lymphocytic leukemia, or acute myeloid leukemia and its precursor, myelodysplastic syndrome. In some embodiments, the leukemia is acute lymphocytic leukemia. In some embodiments, the leukemia is acute myeloid leukemia.

In some embodiments, a myeloproliferative neoplasm is selected from the group consisting of myelofibrosis, essential thrombocythemia (ET), polycythemia vera (PV), chronic neutrophilic leukemia, chronic myelogenous leukemia, acute myelogenous leukemia, chronic eosinophilic leukemia and mastocytosis. In some embodiments, the myeloproliferative neoplasm is selected from the group consisting of myelofibrosis, essential thrombocythemia, polycythemia vera, chronic neutrophilic leukemia, chronic eosinophilic leukemia and mastocytosis. In some embodiments, the myeloproliferative neoplasm is selected from the group consisting of myelofibrosis, essential thrombocythemia, and polycythemia vera. In some embodiments, the myeloproliferative neoplasm is myelofibrosis. In some embodiments, the myeloproliferative neoplasm is essential thrombocythemia or polycythemia vera. Essential thrombocythemia and polycythemia vera can both develop into myelofibrosis. Therefore, in some embodiments, the particles of the invention or a pharmaceutical composition or medicament prepared by use of the particles of the invention are for use to prevent or reduce the progression into fibrotic phase of a myeloproliferative neoplasm such as essential thrombocythemia or polycythemia vera. Therefore, the term "myelofibrosis" as used herein refers to primary myelofibrosis, as well as secondary myelofibrosis, including post-ET myelofibrosis, and post-PV myelofibrosis. In some embodiments, the myelofibrosis is primary myelofibrosis. In some embodiments, the myelofibrosis is secondary myelofibrosis.

In some further embodiments, the cancer is a solid cancer, e.g. bladder cancer, prostate cancer or breast cancer. In some embodiments, the cancer is selected from bladder cancer (such as particular non muscle invasive bladder cancer, muscle invasive bladder cancer and metastatic and urothelial bladder cancer), prostate cancer and renal cell carcinoma. In some embodiments, the cancer is bladder cancer.

In the medical treatment of any given subject by use of the plurality of particles, the pharmaceutical composition, or the pharmaceutical dosage unit provided herein, the dosage level and frequency will generally be determined by the treating physician, with due regard to factors such as and the sex, age, corporal weight and relative health of the treated subject, the selected route and form of administration, the additional use of other drugs, e.g. in a combination therapy.

Generally, a daily dosage ranging from a minimum of 0.001 mg/kg body weight, or 0.002 mg/kg body weight or 0.005 mg/kg body weight or 0.01 mg/kg body weight, to a maximum of 0.2 mg/kg body weight, or 0.1 mg/kg body weight, or 0.05 mg/kg body weight, or 0.02 mg/kg body weight is contemplated.

In some embodiments, the particles of tasquinimod are administered in an amount of 0.1 to 4 mg/day, or 0.2 to 2 mg/day, 0.4 to 1.8 mg/day, 0.5 to 1.5 mg/day, or 0.6 to 1.2 mg/day, e.g. 1 mg/day.

In some embodiments, the dosage may be gradually adjusted to reach optimal results, so-called dosage titration. For example, dosage titration may comprise starting with a low daily dosage of e.g. 0.25 mg and maintaining this dose level for a period of 1 or 2 weeks. In case no significant side effects are encountered that may contraindicate raising the dose, the level may then be increased, e.g. to 0.5 mg/day for 1 or 2 weeks, after which period another increase may be contemplated, to reach a daily dosage of 1 mg, and so on. In such a method, if any significant side effects occur after an incremental increase of the dosage, the dosage may again be reduced to a previous level. Side effects that may occur include those that may generally be encountered in this type of treatment, e.g. gastrointestinal problems, tiredness, and flu-like syndrome, considered to be related to dosage.

Tasquinimod preferably is administered on a daily basis, e.g. 1-3 times a day, or 1-2 times a day, such as once daily. However, in some embodiments, the drug is administered on a less frequent basis, e.g. every two days, once a week etc.

It should be noted that if a pharmaceutically acceptable salt of tasquinimod is administered, an equivalent dosage would be one resulting in the indicated dosage of tasquinimod in non-salt form (i.e. as a free base).

The invention will be further illustrated in the following non-limiting Examples.

EXAMPLES

In the Examples, the tasquinimod particle size distribution was determined using laser light diffraction in a Malvern Mastersizer instrument to determine D(v, 0.5) and D(v, 0.9) values for micronized tasquinimod.

Analysis conditions are shown in Table 1.

TABLE 1

| Analysis Conditions | |
|---|---|
| Sample Unit | Malvern Wet cell accessory |
| Sample Size | ~100 mg |
| Analysis Model | General Purpose (Irregular) |
| Sample Dispersant | Water |
| Stir speed | 2000 rpm |
| Wetting agent | Triton-X-100 (or equivalent) |

TABLE 1-continued

Analysis Conditions

| | |
|---|---|
| Stirring time | 5 minutes |
| Recirculation | 30 seconds at 2000 rpm |
| Obscuration | 15-25% |

The filler used in the Examples was pregelatinised starch, viz. either Starch 1500® or Lycatab C®, and the lubricant was hydrogenated vegetable oil, viz. either Sterotex® and Lubritab®.

Example 1

Tasquinimod Particles Having D(v, 0.5) of 2.3 μm and D(v, 0.9) of 6.9 μm

Tasquinimod powder (80 g) was micronized with a fluid energy jet mill using nitrogen as the processing gas. The feed rate for the unmicronized material was controlled at 6 kg/h by use of a loss-in-weight screw feeder, and the Venturi pressure was set at 69-103 kPa (10-15 psi). The mill pressure was set below 276 kPa (40 psi) and adjusted depending on the result of the in-process control analysis to obtain the desired particle size distribution parameters (D(v, 0.5) and D(v, 0.9)).

Example 2

Tasquinimod Particles Having D(v, 0.5) of 4.9 μm and D(v, 0.9) of 14.0 μm

Tasquinimod particles were prepared described in EXAMPLE 1.

Example 3

Tasquinimod Particles Having D(v, 0.5) of 6.4 μm and D(v, 0.9) of 16.9 μm

Tasquinimod particles were prepared as described in EXAMPLE 1.

Example 4

Oral Capsule Containing 1.0 mg of Tasquinimod (D(v, 0.5) of 2.3 μm, D(v, 0.9) of 6.9 μm)

A capsule for oral administration containing tasquinimod particles of Example 1 in admixture with filler and lubricant was prepared as follows: Tasquinimod particles (0.5 g) were first blended with filler (73 g), whereafter lubricant (1.5 g) was admixed. The obtained mixture was filled into white hard gelatine size 4 capsules. In total, 500 capsules were obtained, each containing 150 mg of the mixture, corresponding to a dose strength of 1.0 mg of tasquinimod.

Example 5

Oral Capsule Containing 1.0 mg of Tasquinimod (D(v, 0.5) of 4.9 μm, D(v, 0.9) of 14.0 μm)

Using the tasquinimod particles of Example 2, the procedure of Example 4 was repeated, to obtain 500 capsules, each having a dose strength of 1.0 mg of tasquinimod.

Example 6

Oral Capsule Containing 1.0 mg of Tasquinimod (D(v, 0.5) of 6.4 μm, D(v, 0.9) of 16.9 μm)

Using the tasquinimod particles of Example 3, the procedure of Example 4 was repeated, to obtain 500 capsules, each having a dose strength of 1.0 mg of tasquinimod.

Comparative Example 1

Oral capsule containing 1.0 mg of tasquinimod (D(v, 0.5) of 15.9 μm, D(v, 0.9) of 38.1 μm) A capsule containing micronized tasquinimod particles having D(v, 0.5) of 15.9 μm and D(v, 0.9) of 38.1 μm, in admixture with filler and lubricant, was prepared by following the procedure of Example 4. Each capsule contained 150 mg of the mixture, corresponding to a dose strength of 1.0 mg of tasquinimod.

Comparative Example 2

Oral Capsule Containing 1.0 mg of Tasquinimod (D(v, 0.5) of 22.4 μm, D(v, 0.9) of 63.8 μm)

A capsule containing micronized tasquinimod particles having D(v, 0.5) of 22.4 μm and D(v, 0.9) of 63.8 μm, in admixture with filler and lubricant, was prepared by following the procedure of Example 4. Each capsule contained 150 mg of the mixture, corresponding to a dose strength of 1.0 mg of tasquinimod.

Comparative Example 3

Oral Capsule Containing 1.0 mg of Tasquinimod (D(v, 0.5) of 39.9 μm, D(v, 0.9) of 121.1 μm)

A capsule containing unmicronized tasquinimod particles, having D(v, 0.5) of 39.9 μm and D(v, 0.9) of 121.0 μm, in admixture with filler and lubricant, was prepared by following the procedure of Example 4. Each capsule contained 150 mg of the mixture, corresponding to a dose strength of 1.0 mg of tasquinimod.

Dissolution Profile

The dissolution rate of Examples 4-6 and of Comparative Examples 1-3, respectively, was studied using a Ph. Eur./USP dissolution apparatus 1 (Type I basket) with 500 mL volume of dissolution media with 37° C. bath temperature and 100 rpm stirring speed, and with liquid chromatography (LC) sample testing.

The dissolution media was 0.05 M phosphate buffer, pH 6.8, selected to ensure that at least 85% of tasquinimod would be dissolved at the end of the test, tasquinimod being a weak acid with a pKa of 6.5 and with a solubility that increases with pH. The dissolution profiles obtained are shown in FIG. 1. It is noted that even at a D(v, 0.5) of only 15.9 μm, the tasquinimod particles have a surprisingly low dissolution rate.

For further investigation, the obtained dissolution profiles were compared statistically using the f1/f2 tests (Model Independent Approach Using a Similarity Factor) with Example 5 selected as a reference, cf. Table 2.

TABLE 2

Statistical comparison of drug products dissolution profiles

| Oral Capsule | Ex. 4 | Ex. 5 | Ex. 6 | Comp. Ex. 1 | Comp. Ex. 2 | Comp. Ex. 3 |
|---|---|---|---|---|---|---|
| D(v, 0.5) (μm) | 2.3 | 4.9 | 6.4 | 15.9 | 22.4 | 39.9 |
| D(v, 0.9) (μm) | 6.9 | 14.0 | 16.9 | 38.1 | 63.8 | 121.0 |

TABLE 2-continued

Statistical comparison of drug products dissolution profiles

| Oral Capsule | Ex. 4 | Ex. 5 | Ex. 6 | Comp. Ex. 1 | Comp. Ex. 2 | Comp. Ex. 3 |
|---|---|---|---|---|---|---|
| tasquinimod dissolved after 30 minutes (% by weight) | 96 | 96 | 95 | 87 | 82 | 59 |
| Difference factor f1 | 3.5 | Ref. | 5.2 | 19.2 | 27.4 | 52.8 |
| Similarity factor f2 | 64.1 | Ref. | 63.5 | 36.8 | 29.8 | 16.5 |

In the comparison of dissolution profiles using f1/f2 values, f1 values up to 15 (0-15) and f2 values greater than 50 (50-100) are considered indicative of similarity or equivalence of two dissolution profiles. The f1/f2 statistical comparison tests showed that the capsules of Examples 4 and 6, containing tasquinimod particles having D(v, 0.5) of 2.3 μm and 6.4 μm, respectively, had dissolution profiles similar to that of Example 5, whereas Comparative Examples 1-3, containing tasquinimod particles having D(v, 0.5) ranging from 15.9 to 39.9 μm had dissolution profiles corresponding to a significantly slower dissolution rate than that of Example 5.

Example 7

Tasquinimod Particles Having D(v, 0.5) of 7.5 μm and D(v, 0.9) of 24.7 μm

Tasquinimod particles (total amount 4.5 kg) were prepared essentially as described in EXAMPLE 1.

Example 8

Tasquinimod Particles Having D(v, 0.5) of 4.3 μm and D(v, 0.9) of 18.3 μm

Tasquinimod particles (total amount 0.9 kg) were prepared essentially as described in EXAMPLE 1.

Example 9

Tasquinimod particles having D(v, 0.5) of 3.4 μm and D(v, 0.9) of 11.5 μm

Tasquinimod particles (total amount 4.5 kg) were prepared essentially as described in EXAMPLE 1.

Figure 2:
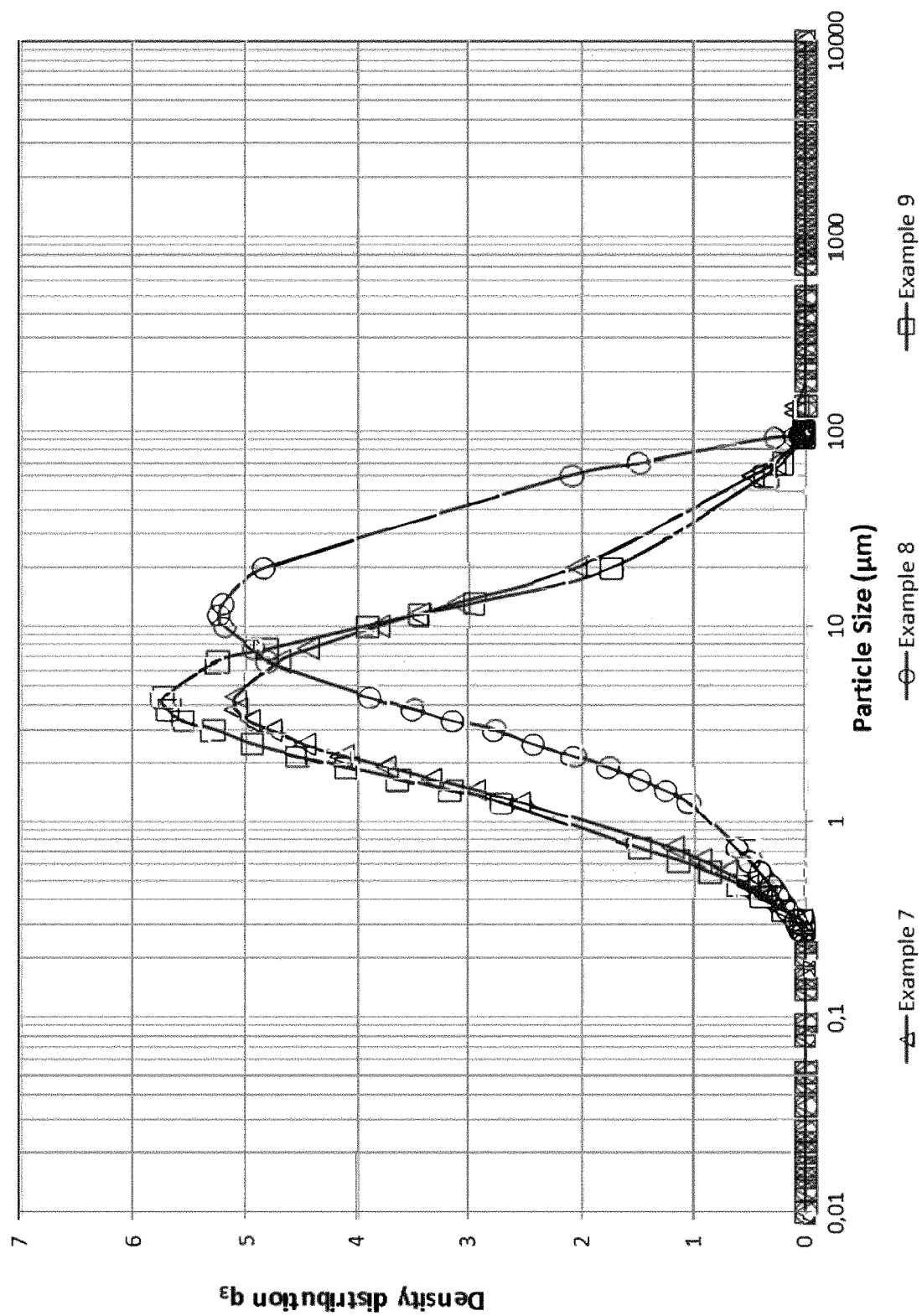
FIG. 2 represents the density distribution (q3) measured by laser diffraction, as a function of particle size in µm, for tasquinimod particles of Examples 7, 8 and 9.

The particle size distribution was measured for the particles of Examples 7 to 9. The results are shown in FIG. 2.

Example 10

Tasquinimod Particles Having D(v, 0.5) of 8.5 μm and D(v, 0.9) of 21.7 μm

Tasquinimod particles (total amount 2.8 kg) were prepared essentially as described in EXAMPLE 1.

Example 11

Oral Capsule Containing 0.25 mg of Tasquinimod (D(v, 0.5) of 7.5 μm, D(v, 0.9) of 24.7 μm)

A capsule for oral administration containing tasquinimod particles of Example 7 in admixture with filler and lubricant was manufactured in industrial scale as follows: Tasquinimod particles (0.17% by total weight of mixture) were first blended with filler (97.83% by total weight of mixture), whereafter lubricant (2.00% by total weight of mixture) was admixed. The obtained mixture (180 kg) was filled into white hard gelatine size 4 capsules. Each capsule contained 150 mg of the mixture, corresponding to a dose strength of 0.25 mg of tasquinimod, resulting in a maximum batch size of 1,200,000 capsules.

Example 12

Oral Capsule Containing 0.5 mg of Tasquinimod (D(v, 0.5) of 4.3 μm, D(v, 0.9) of 18.3 μm)

A capsule for oral administration containing tasquinimod particles of Example 8 in admixture with filler and lubricant was manufactured in industrial scale as follows: Tasquinimod particles (0.33% by total weight of mixture) were first blended with filler (97.67% by total weight of mixture), whereafter lubricant (2.00% by total weight of mixture) was admixed. The obtained mixture (180 kg) was filled into white hard gelatine size 4 capsules. Each capsule contained 150 mg of the mixture, corresponding to a dose strength of 0.5 mg of tasquinimod, resulting in a maximum batch size of 1,200,000 capsules.

Example 13

Oral Capsule Containing 1.0 mg of Tasquinimod (D(v, 0.5) of 3.4 μm, D(v, 0.9) of 11.5 μm)

A capsule for oral administration containing tasquinimod particles of Example 9 in admixture with filler and lubricant was manufactured in an industrial scale as follows: Tasquinimod particles (0.67% by total weight of mixture) were first blended with filler (97.33% by total weight of mixture), whereafter lubricant (2.00% by total weight of mixture) was admixed. The obtained mixture (180 kg) was filled into white hard gelatine size 4 capsules. Each capsule contained 150 mg of the mixture, corresponding to a dose strength of 1.0 mg of tasquinimod, resulting in a maximum batch size of 1,200,000 capsules.

Example 14

Oral Capsule Containing 1.0 mg of Tasquinimod (D(v, 0.5) of 8.5 μm, D(v, 0.9) of 21.7 μm)

Figure 3:
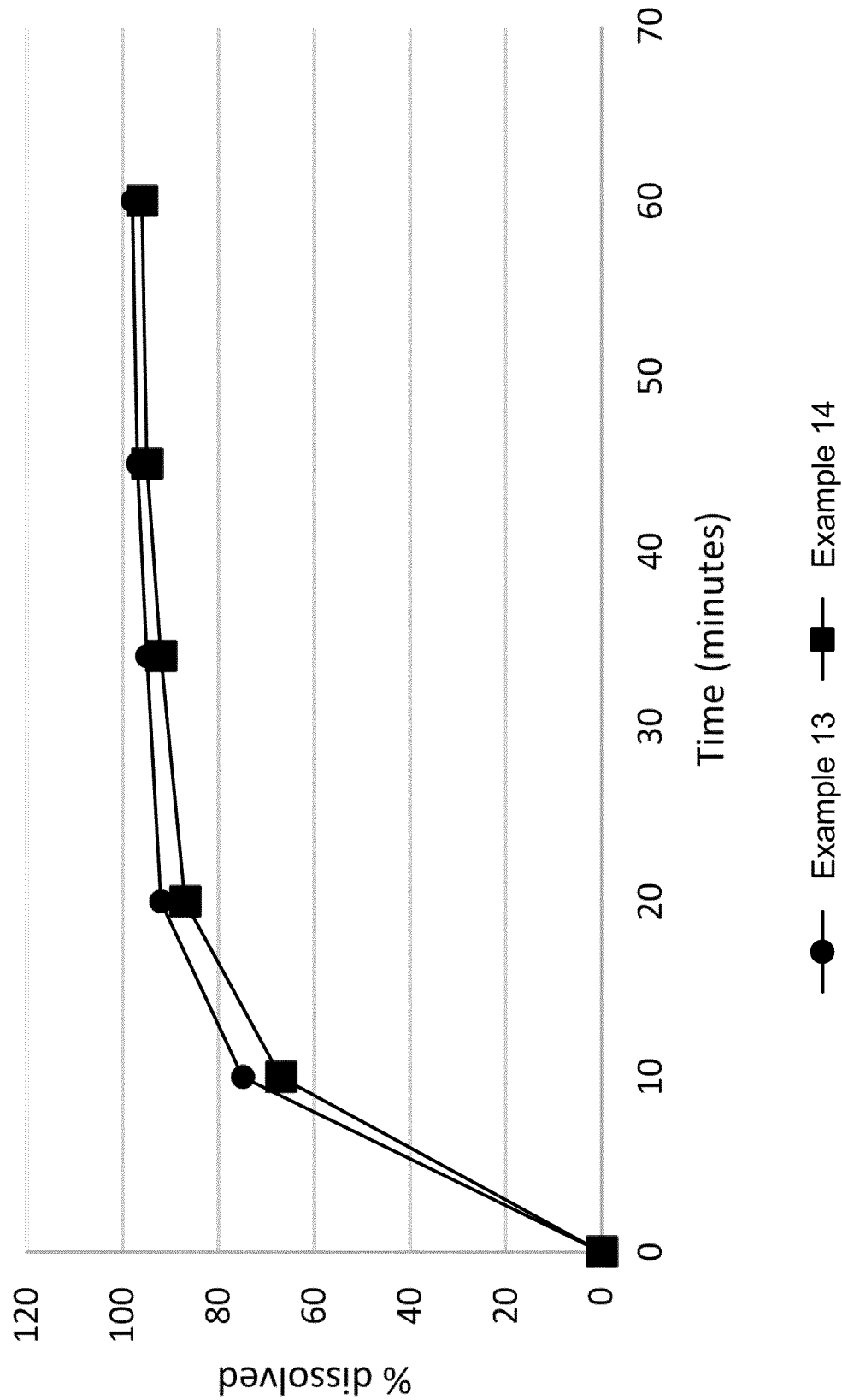
FIG. 3 represents the % by weight of tasquinimod dissolved as a function of time from capsules of Examples 13 and 14, each containing 1 mg of tasquinimod particles having D(v, 0.5) of 3.4 µm and 8.5 µm, respectively, in an in vitro dissolution test.

A capsule for oral administration containing tasquinimod particles of Example 10 in admixture with filler and lubricant was manufactured in an industrial scale as follows: Tasquinimod particles (0.67% by total weight of mixture) were first blended with filler (97.33% by total weight of mixture), whereafter lubricant (2.00% by total weight of mixture) was admixed. The obtained mixture (180 kg) was filled into white hard gelatine size 4 capsules. Each capsule contained 150 mg of the mixture, corresponding to a dose strength of 1.0 mg of tasquinimod, resulting in a maximum batch size of 1,200,000 capsules. The dissolution rates of the capsules of Examples 13 and 14 were measured in an assay as described herein above. The results are shown in FIG. 3.

Example 15

Tasquinimod Particles Having D(v, 0.5) of 4.8 μm and D(v, 0.9) of 16.0 μm

Tasquinimod particles (total amount 0.9 kg) were prepared essentially as described in EXAMPLE 1.

Example 16

Tasquinimod Particles Having D(v, 0.5) of 5.2 µm and D(v, 0.9) of 16.0 µm

Tasquinimod particles (total amount 2.0 kg) were prepared essentially as described in EXAMPLE 1.

Example 17

Oral Capsule Containing 1.0 mg of Tasquinimod (D(v, 0.5) of 4.8 µm, D(v, 0.9) of 16 µm)

Using the tasquinimod particles of Example 15, the procedure of Example 13 was repeated, to obtain 200 000 capsules, each capsule containing 1.0 mg of tasquinimod.

Examples 18-20

Oral Capsule Containing 1.0 mg of Tasquinimod (D(v, 0.5) of 5.2 µm, D(v, 0.9) of 16 µm)

Using the tasquinimod particles of Examples 16, the procedure of Example 13 was repeated, to obtain 3 batches of 200 000 capsules, each capsule containing 1.0 mg of tasquinimod. The dissolution rates of the capsules of Examples 17-20 were measured in an assay as described herein above. The results are shown in FIG. 4.

Figure 4:
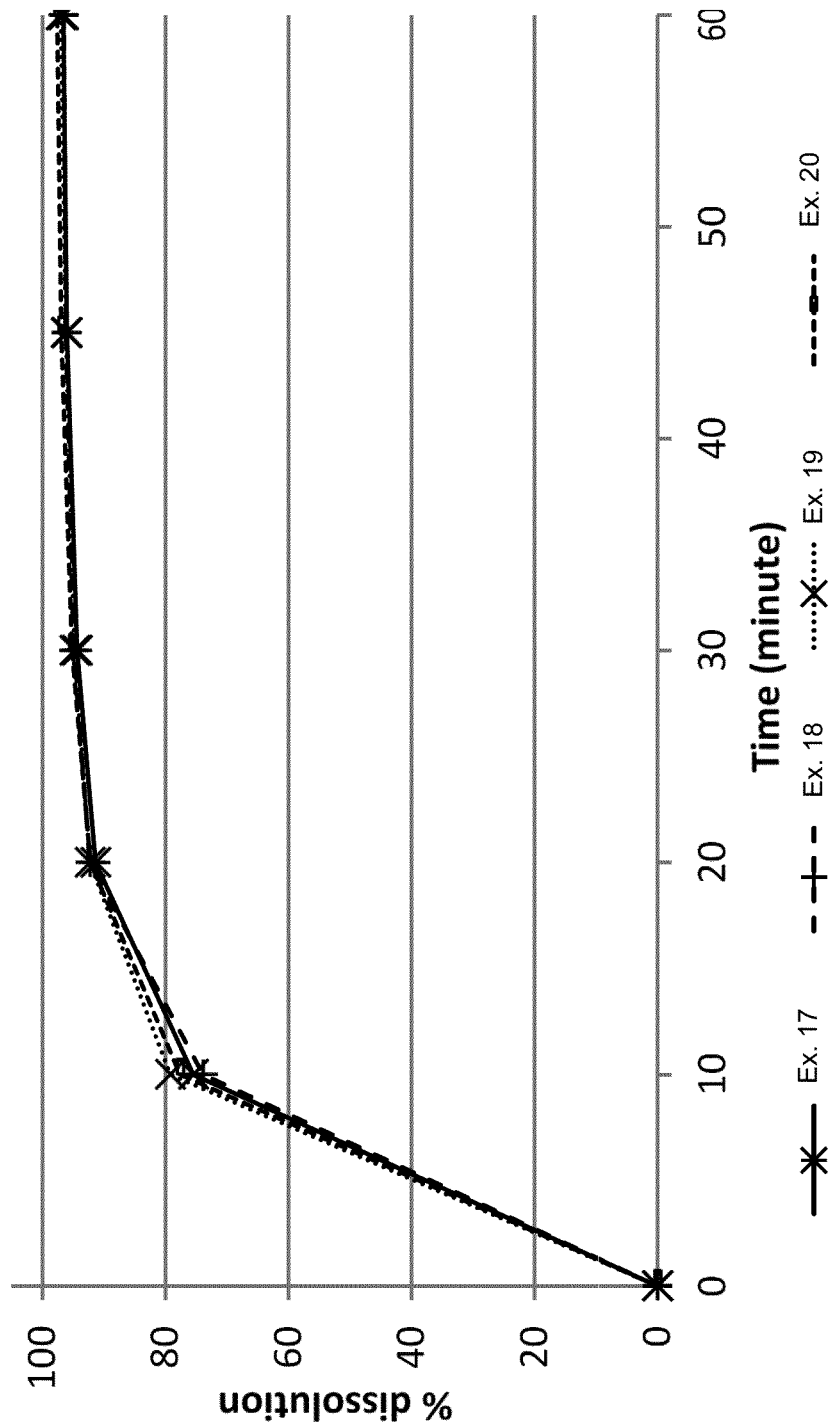
FIG. 4 represents the % by weight of tasquinimod dissolved as a function of time from capsules of Example 17, containing 1.0 mg of tasquinimod particles having D(v, 0.5) of 4.8 µm, and capsules of Examples 18-20, containing 1.0 mg of tasquinimod particles having D(v, 0.5) of 5.2 µm.

As illustrated in FIG. 4, the dissolution profiles of the different batches of capsules are very similar for capsules containing tasquinimod particles having D(v, 0.5) of 4.8 µm (Example 17) and 5.2 µm (Examples 18-20), respectively, and the dissolution profiles correspond to an immediate release formulation.

Example 21

Tasquinimod Particles Having D(v, 0.5) of 6.0 µm and D(v, 0.9) of 16 µm

Tasquinimod powder (300 g) was micronized with an Alpine® Spiral Jet Mill 50 AS (from Hosokawa Alpine AG, Germany) using nitrogen as the processing gas. The feed rate for the unmicronized material was controlled at 10 g/min by use of a vibratory feeder, and the injector pressure was set at 1.8-5 bar. The mill pressure was set at 0.5-1 bar to obtain the desired particle size distribution parameters (D(v, 0.5) and D(v, 0.9)).

Example 22

Oral Capsule Containing 0.25 mg of Tasquinimod (D(v, 0.5) of 6.0 µm, D(v, 0.9) of 16 µm)

A capsule for oral administration, containing tasquinimod particles of Example 21 in admixture with filler and lubricant, was manufactured in an industrial scale as follows: Tasquinimod particles (0.17% by total weight of mixture) were first blended with filler (97.83% by total weight of mixture), whereafter lubricant (2.00% by total weight of mixture) was admixed. The obtained mixture (7.5 kg) was filled into white hard gelatine size 4 capsules. Each capsule contained 150 mg of the mixture, corresponding to a dose strength of 0.25 mg of tasquinimod, resulting in a maximum batch size of 50,000 capsules.

The dissolution rates of capsules of Example 22 were measured in an assay as described herein above. The obtained dissolution profiles were similar to those of Examples 17-20 and corresponded to an immediate release formulation.

The invention claimed is:

1. A plurality of particles comprising tasquinimod in free base form or as a pharmaceutically acceptable salt, said particles having a D (v,0.9) of at most 30 µm and a D (v,0.5) of at most 15 µm.

2. The plurality of particles of claim 1, wherein said particles have a D (v,0.9) of at most 25 µm, and a D (v,0.5) in the range of 2 µm to 9 µm.

3. The plurality of particles of claim 1, wherein said particles have a D (v,0.5) in the range of 3 to 7 µm.

4. A pharmaceutical composition comprising the plurality of particles of claim 1, and one or more pharmaceutically acceptable excipients.

5. The pharmaceutical composition of claim 4, comprising said plurality of particles in an amount of from 0.1 to 10% by weight of the composition.

6. The pharmaceutical composition of claim 4, wherein the pharmaceutically acceptable excipients comprise a filler and a lubricant.

7. A pharmaceutical dosage unit comprising the pharmaceutical composition of claim 4.

8. The pharmaceutical dosage unit of claim 7, containing the plurality of particles in an amount in the range of 0.1 mg to 2 mg.

9. The pharmaceutical dosage unit of claim 7, for oral administration.

10. The pharmaceutical dosage unit of claim 9, which is a capsule or tablet.

11. The pharmaceutical dosage unit of claim 7, which is an immediate-release pharmaceutical dosage unit.

12. A method for the treatment of cancer by administering, to a mammal in need of such treatment, a therapeutically effective amount of the plurality of particles of claim 1.

13. The method of claim 12, wherein the cancer is a hematologic cancer.

14. The method of claim 13, wherein the hematological cancer is selected from multiple myeloma, lymphoma, myelodysplastic syndrome, myeloproliferative neoplasm, and leukemia.

15. The method of claim 12, wherein the cancer is a solid cancer.

16. The method of claim 15, wherein the solid cancer is selected from bladder cancer, melanoma, lung cancer, colorectal cancer, breast cancer, pancreatic cancer, prostate cancer, renal cell carcinoma, ovarian cancer, neuroendocrine tumors (NET) and gastroenteropancreatic neuroendocrine tumors (GEP-NET).

17. The pharmaceutical dosage unit of claim 7, containing the plurality of particles in an amount in the range of 0.2 mg to 1 mg.

* * * * *